(12) United States Patent
Kramer et al.

(10) Patent No.: US 7,650,639 B2
(45) Date of Patent: Jan. 19, 2010

(54) SYSTEM AND METHOD FOR PROTECTING A LIMITED RESOURCE COMPUTER FROM MALWARE

(75) Inventors: Michael Kramer, Yonkers, NY (US);
Marc E Seinfeld, Mid Levels (HK);
Ryan W J Waite, Seattle, WA (US);
Eric L A Lantz, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 811 days.

(21) Appl. No.: 11/096,491

(22) Filed: Mar. 31, 2005

(65) Prior Publication Data

US 2006/0236393 A1 Oct. 19, 2006

(51) Int. Cl.
*G06F 12/14* (2006.01)

(52) U.S. Cl. .......................................... 726/23; 726/25

(58) Field of Classification Search .................. 726/22, 726/23, 24, 25; 713/188
See application file for complete search history.

(56) References Cited

U.S. PATENT DOCUMENTS

| | | | |
|---|---|---|---|
| 6,088,803 A * | 7/2000 | Tso et al. ..................... 726/22 |
| 6,944,772 B2 * | 9/2005 | Dozortsev .................... 713/180 |
| 7,080,000 B1 * | 7/2006 | Cambridge ................... 703/21 |
| 2001/0056411 A1 * | 12/2001 | Lindskog et al. .............. 705/76 |
| 2002/0042886 A1 * | 4/2002 | Lahti et al. ................... 713/201 |
| 2003/0023866 A1 * | 1/2003 | Hinchliffe et al. ........... 713/200 |
| 2003/0120951 A1 * | 6/2003 | Gartside et al. ............. 713/201 |
| 2003/0177397 A1 * | 9/2003 | Samman ...................... 713/201 |
| 2004/0143650 A1 * | 7/2004 | Wollowitz .................... 709/219 |
| 2004/0158741 A1 * | 8/2004 | Schneider ................... 713/201 |
| 2005/0193217 A1 * | 9/2005 | Case et al. ................... 713/200 |
| 2006/0095966 A1 * | 5/2006 | Park ............................ 726/22 |

* cited by examiner

*Primary Examiner*—Nasser G Moazzami
*Assistant Examiner*—Eleni A Shiferaw
(74) *Attorney, Agent, or Firm*—Workman Nydegger

(57) ABSTRACT

The present invention is directed to a system and methods for protecting a limited resource computer from malware. Aspects of the present invention use antivirus software on a general purpose computer to prevent malware from infecting a limited resource computer. Typically, antivirus software on the general purpose computer is kept "up-to-date" with the most recent software updates. When a connection is established between the limited resource computer and the general purpose computer, a signature of each application installed on the limited resource computer is transmitted to the general purpose computer. Then antivirus software on the general purpose computer compares the received signatures to known malware. Finally, the results of the scan are reported to the limited resource computer.

3 Claims, 5 Drawing Sheets

| APPLICATION SIGNATURE | FIRST BIT | SECOND BIT |
|---|---|---|
| 3Y298EKSI | 1 | 1 |
| 78DKSIE98 | 1 | 0 |
| 98SKISKOI | 1 | 1 |
| E389SKISO | 0 | 0 |
| 2SIE89SKS | 0 | 0 |

Fig.4.

SYSTEM AND METHOD FOR PROTECTING A LIMITED RESOURCE COMPUTER FROM MALWARE

FIELD OF THE INVENTION

The present invention relates to computers and, more particularly, to protecting a limited resource computer from malware.

BACKGROUND OF THE INVENTION

Small, mobile, limited-resource computers, such as personal desktop assistants, including hand-held and palm-type computers, are becoming increasingly popular for use by business people and others who must travel and thus cannot readily access information stored on their desktop computer or office network workstation. Although laptop computers are capable of running virtually all of the application programs that execute on desktop computers, laptop computers are often either too large and/or too heavy to carry around. There is thus an increased demand for small, limited resource computers that are able to run business applications of less complexity than those designed to run on a desktop computer that enable a user to quickly access all types of personal and business related data, such as addresses, telephone numbers, scheduled appointment times, etc.

Increasingly, limited resource computers are configured to access data on various networks, such as the Internet. As a consequence, limited resource computers have become susceptible to invasions or attacks delivered over the network. As those skilled in the art and others will recognize, these attacks come in many different forms, including, but certainly not limited to, computer viruses, computer worms, system component replacements, denial of service attacks, even misuse/abuse of legitimate computer system features all of which exploit one or more computer system vulnerabilities for illegitimate purposes. While those skilled in the art will recognize that the various computer attacks are technically distinct from one another, for purposes of the present invention and for simplicity in description, all malicious computer programs that spread on computer networks, such as the Internet, will be generally referred to hereinafter as computer malware or, more simply, malware.

When a limited resource computer is attacked or "infected" by computer malware, the adverse results are varied, including disabling system devices; erasing or corrupting firmware, applications, or data files; transmitting potentially sensitive data to another location on the network; shutting down the computer; or causing the computer to crash. Yet another pernicious aspect of many, though not all, computer malware is that an infected computer may be used to infect other computers that are communicatively connected by a network connection.

On a general purpose computer, such as desktop or laptop computer, a traditional defense against computer malware and, particularly, against computer viruses and worms, is commercially available antivirus software. Most antivirus software that is designed for a general purpose computer implements a scan engine that identifies malware by matching patterns within data to what is referred to as a "signature" of the malware. More specifically, one known method for identifying malware with a scan engine includes obtaining a copy of the malware "in the wild." The program code or a characteristic subset of the program code that implements the malware is processed with a hash function that converts the program code into a signature. Then, in response to an event, the scan engine searches data associated with the event for a match to a malware signature.

The malware detection techniques employed by general purpose computers are not well suited for limited resource computers. For example, in the signature-based malware detection system described above, antivirus software is updated frequently, with a malware signature being transmitted to a general purpose computer whenever a new malware is identified. However, typically, a limited resource computer connects to a network, such as the Internet, through a bandwidth-constrained network connection. In this instance, obtaining and storing the data required to identify new malware, as occurs on some general purpose computers, is not possible given the limited resources (e.g., storage space, bandwidth, processing power, etc.) that are available on limited resource computers.

SUMMARY OF THE INVENTION

The foregoing problems with the state of the prior art are overcome by the principles of the present invention, which is directed toward a system and methods for protecting a limited resource computer from malware.

One aspect of the present invention is a method that uses a general purpose computer to prevent malware from infecting a limited resource computer. More specifically, the method comprises filtering application data at a general purpose computer that is being transmitted to the limited resource computer; causing antivirus software on the general purpose computer to scan the application data for malware; and reporting whether the application data is malware to the limited resource computer. If the application data is malware, the method will typically prevent the application data from being transmitted and/or executed by the limited resource computer. Conversely, if malware is not identified, the method will allow the application data to be transmitted and/or executed by the limited resource computer.

Another aspect of the present invention is a method of determining whether an application that is installed on the limited resource computer is infected with malware. In one embodiment of the present invention, the method includes generating a signature of the application or a characteristic subset of the application; transmitting the signature to the general purpose computer; and identifying whether the signature transmitted to the general purpose computer matches a signature that is characteristic of malware. In this embodiment, antivirus software on the general purpose computer is maintained with "up-to-date" malware signatures so that previously unidentified malware may be detected.

In still another embodiment, a computer system is provided with software modules on a general purpose computer and a limited resource computer that prevent malware from being executed on the limited resource computer.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 4 is a pictorial depiction of an exemplary signature database suitable to track the state of an application installed on a limited resource computer, in accordance with the present invention.

DETAILED DESCRIPTION

Figure 1:
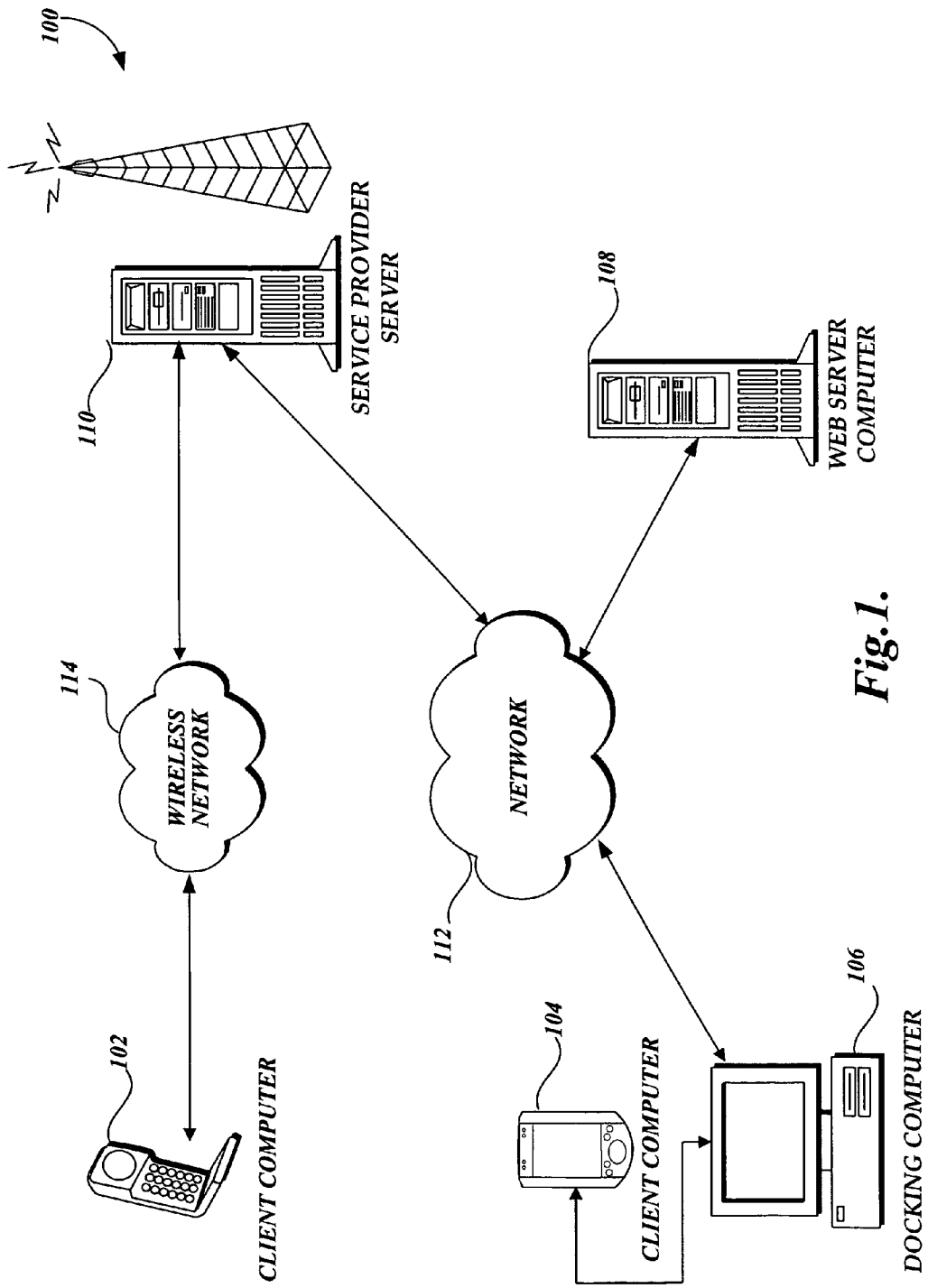
FIG. 1 is a pictorial depiction of a networking environment that includes a service provider computer and a docking computer suitable to perform a scan for malware on behalf of a limited resource computer, in accordance with the present invention.

FIG. 1 and the following discussion are intended to provide a brief general description of a suitable networking environment in which the invention may be implemented. Although not required, the invention will be described in the general context of computer-executable instructions, such as program modules, being executed by a limited resource computer, such as a personal digital assistant. Generally described, program modules include routines, programs, objects, components, data structures, and the like that perform particular tasks or implement particular abstract data types.

As those skilled in the art will appreciate from the following description, while the invention is ideally suited for incorporation in a limited resource computer and is described as applying to such a computer, the invention may be incorporated in other computers and systems.

Figure 3:
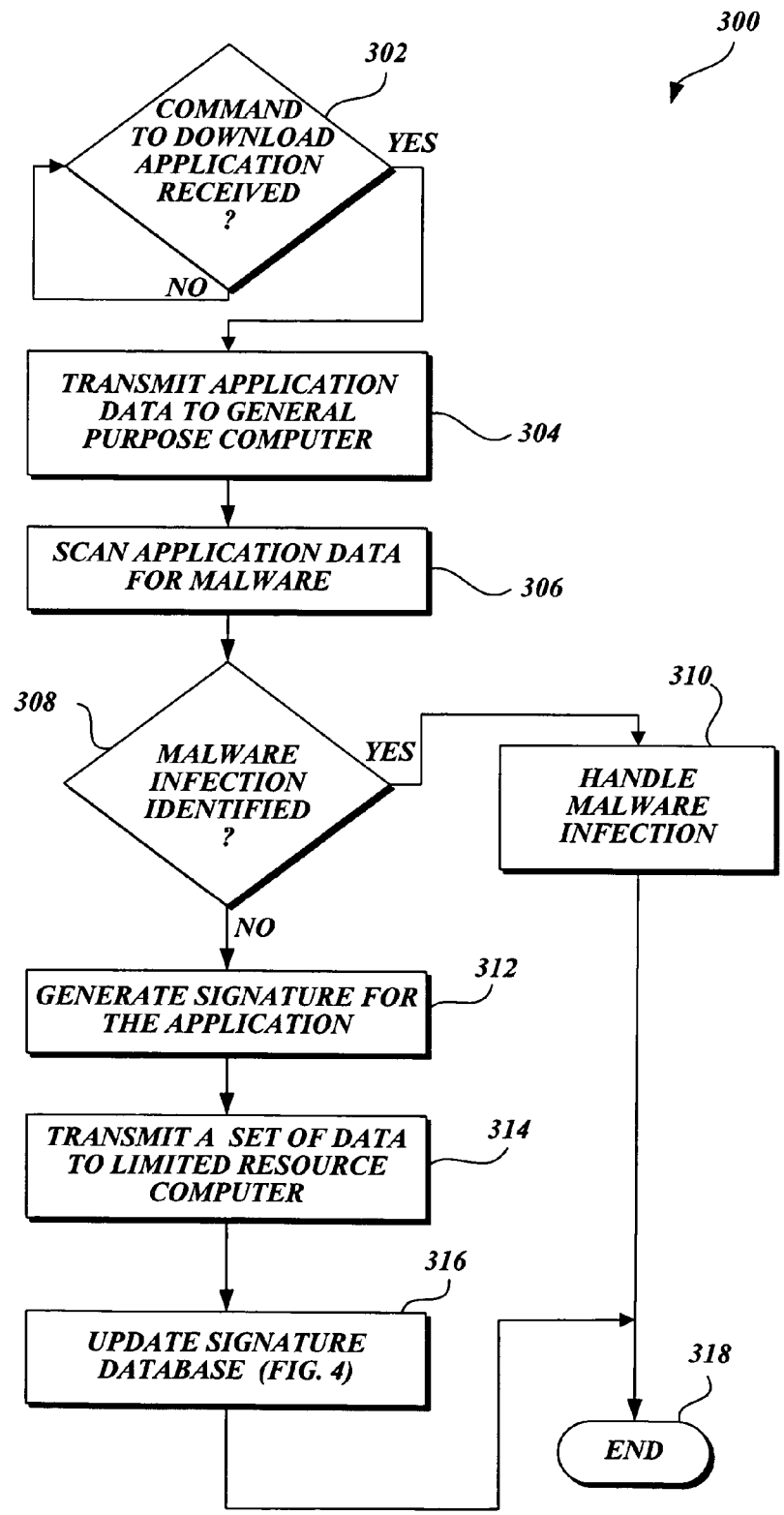
FIG. 3 is a flow diagram illustrating one exemplary embodiment of a software-implemented method that scans application data for malware before the application data is downloaded onto a limited resource computer, in accordance with the present invention.

Referring to FIG. 1, the following is intended to provide an exemplary overview of one suitable networking environment 100 in which the invention may be implemented. The illustrated networking environment 100 comprises a plurality of client computers 102 and 104, a docking computer 106, a Web server computer 108, and a service provider server 110. As illustrated in FIG. 1, the client computer 104, the docking computer 106, the Web server computer 108, and the service provider server 110 are communicatively connected via the network 112, which may be implemented as a local area network ("LAN"), wide area network ("WAN"), or even the Internet. As known to those skilled in the art and others, the computers connected to the network 112 may be configured to exchange documents, commands, and other types of data over the network 112. Also, as illustrated in FIG. 3, the service provider server 110 and the client computer 102 are communicatively connected via the wireless network 114, which may be implemented using wireless protocols generally known in the art. Similar to the network 112, the computers connected to the wireless network 114 may be configured to exchange documents, commands, and other types of data, including data that originated from the network 112.

The present invention may be implemented in a number of different contexts, of which the following are examples. Cellular and other wireless service providers have an existing infrastructure that allows subscribers of the wireless network to access data from "wired" networks, such as the Internet. In this instance, data transmitted from a computer connected to the Internet (e.g., the Web server computer 108) to a client computer connected to a wireless network (e.g., the client computer 102) is first received by a general purpose computer (e.g., the service provider server 110) and then forwarded to the client computer 102. The present invention may be implemented in this type of existing infrastructure to prevent malware from infecting a limited resource computer, such as client computer 102. For example, the service provider server 110 and the client computer 102 may implement aspects of the present invention to identify malware designed to infect the client computer 102.

Manufacturers of limited resource computers, such as PDAs, tablets, cell phones, and the like, have existing systems that allow a limited resource computer to "dock" with a general purpose computer. FIG. 1 illustrates this type of docking relationship where the client computer 104 and the docking computer 106 are communicatively connected through a direct communication link. Typically, in these types of systems, the general purpose computer (e.g., the docking computer 106) obtains applications and other data on behalf of the limited resource computer (e.g., the client computer 104) from a remote computer (Web server computer 108) via the Internet. Then the data obtained by the general purpose computer is forwarded to the limited resource computer. In some systems, the general purpose computer and the limited resource computer maintain a shared directory where communication occurs through "synchronizing" data in the shared directory. In any event, the docking computer 106 and the client computer 104 may implement the present invention, so that antivirus software on the docking computer 106 may be used to protect the client computer 104 from malware.

In the exemplary embodiments of the present invention described above, a general purpose computer identifies malware on behalf of a limited resource computer. As a result, more effective malware detection techniques may be employed to detect malware than is possible when antivirus software is installed on a limited resource computer. For example, all known malware signatures may be stored on a general purpose computer and compared to incoming network data. Given storage limitations, all known malware signatures may not be stored and/or compared to incoming network data on a limited resource computer.

Figure 2:
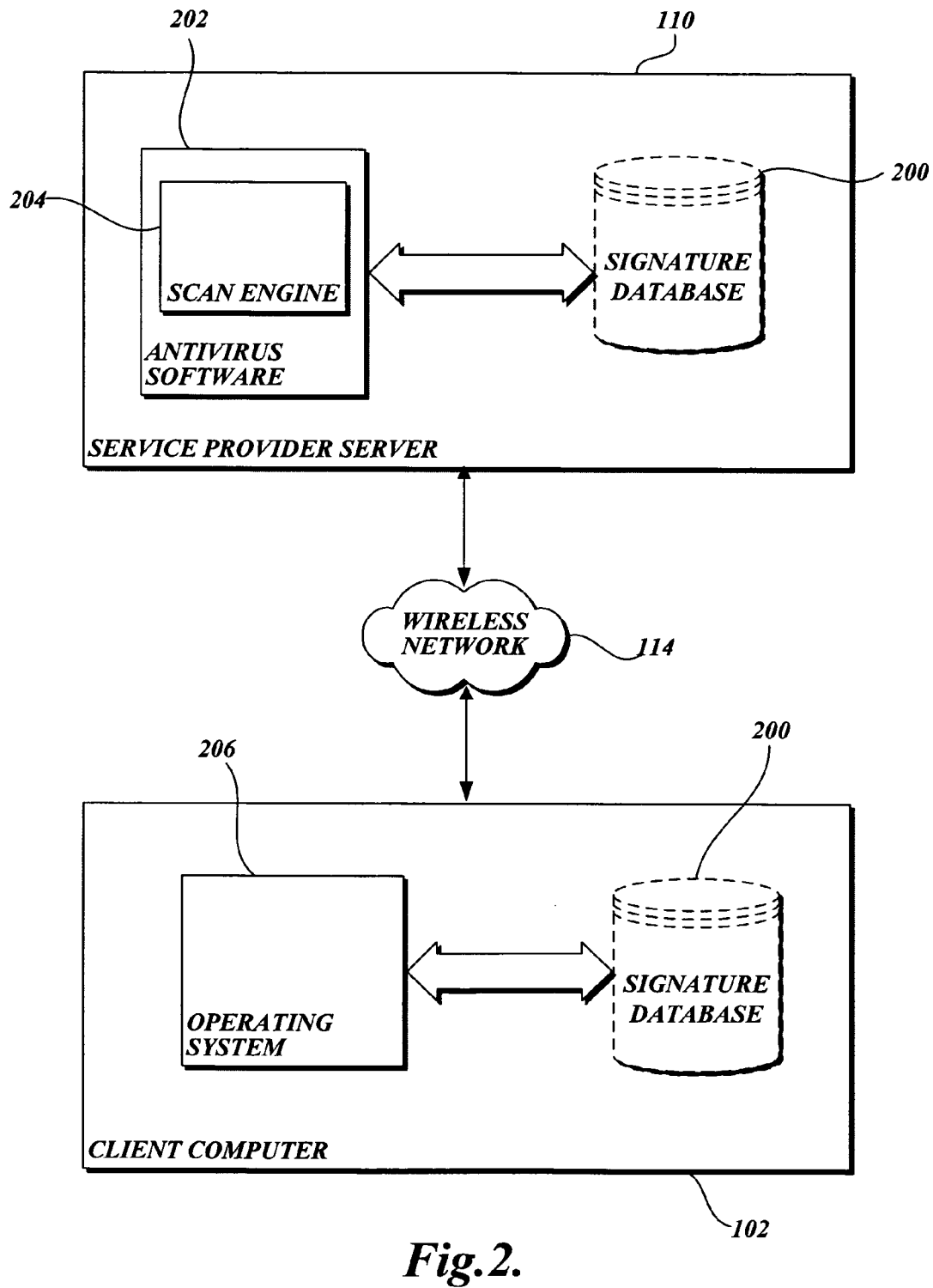
FIG. 2 is a block diagram that illustrates components of a malware detection system that efficiently detects malware on a limited resource computer, in accordance with the present invention.

With reference to FIG. 2, an exemplary software system that illustrates one exemplary embodiment of the present invention will be described. FIG. 2 illustrates components included in the service provider server 110 and the client computer 102 depicted in FIG. 1. More specifically, as illustrated in FIG. 2, the service provider server 110 includes a signature database 200 and antivirus software 202 that includes a scan engine 204. Also, as depicted in FIG. 2, the client computer includes the signature database 200 and an operating system 206. Collectively, the components illustrated in FIG. 2, which implement aspects of the present invention, provide an efficient way to protect the client computer 102 from malware.

As illustrated in FIG. 2, the service provider server 110 maintains antivirus software 202 that includes a scan engine 204 designed to detect malware. Many different software vendors include a scan engine or equivalent mechanism in antivirus software that is designed to identify data characteristic of malware. One known technique employed by some existing scan engines for identifying malware includes obtaining a copy of the malware "in the wild." Then application data that implements the malware, or a characteristic subset of the application data, is processed with a hash function that converts the application data into a "signature" that may be used to identify the malware. For example, a characteristic subset of a malware may be identified and processed with a hash function. In instances when the malware is a virus and attaches itself to a benevolent file, contents of the file (which includes data that implements the virus) are compared to a characteristic subset of the known malware. The scan engine 204 illustrated in FIG. 2 may employ this known technique to scan application data for a malware signature. Also, increasingly, heuristic techniques are being used to detect malware that may be used by the scan engine 204. In any event, it should be well understood that any of these and other malware detection techniques may be implemented in the antivirus software 202.

The scan engine 204 may be configured to perform additional types of analysis in order to determine if incoming data is infected with malware. For example, some antivirus software "emulates" application execution to detect behaviors that are characteristic of malware. Those skilled in the art and others will recognize that general purpose computers typically use hardware that complies with a narrow set of processor architectures, such as the "x86" architecture. Conversely, a large diversity of processor architectures is used in limited resource computers that include, but are not limited to, numerous variants on the Acorn RISC Machine ("ARM") architecture and the Reduced Instruction Set Computer ("RISC") architecture. Computers translate high-level code into binary instructions before the instructions are executed. However, the logic for performing the translation and instructions generated are not the same for computers that implement different processor architectures. Thus, in order to emulate an application, for purposes of malware detection, the scan engine 204 or other component of a general resource computer uses an "emulation environment" (not shown) that simulates the processing performed by one or more limited resource computers. However, since generating an emulation environment for simulating a limited resource computer is generally known in the art of emulation, further description of this aspect of the present invention will not be provided here. Moreover, since limited resource computers use a wide variety of processor architectures, a component of the general resource computer identifies the processor architecture of a limited resource computer that is being protected from malware. In one embodiment of the present invention, identifying the correct processor architecture includes examining application data and determining on which processor architecture the application data is designed to be executed. In an alternative embodiment, multiple emulations may be attempted until the correct processor architectures are identified. In this instance, if an application cannot be emulated, a default position may be to identify the application is malware.

In one embodiment of the present invention, where the client computer 102 requests an application from a "wired" network, the application data is intercepted at the service provider server 110. At the service provider server 110, the application data is processed with a hash algorithm that generates a signature of the application. Then, the signature of the application is compared to signatures of known malware by the scan engine 204. If the application is not identified as known malware, the application data, the signature, and a variable indicative of the results of the scan for malware (hereinafter referred to as the application's "security status") are forwarded to the client computer 102 over the wireless network 114. Typically, if the application is not identified as malware, it will be installed on the client computer 102. Also, the signature of the application and the variable indicative of the application's security status are added to the signature database 200 maintained on the client computer 102. If the application was identified as malware, the service provider server 110 may be configured to only forward a signature and security status of the application, which indicates the application is known malware.

In an alternative embodiment of the present invention, the service provider server 110 and the client computer 102 communicate data using a synchronization system. In this instance, the signature of the application and the variable indicative of the application's security status may be added to the signature database 200 maintained on the service provider server 110. Then the application data 200 and an "up-to-date" version of signature database 200 are forwarded to the client computer 200 using a synchronization system (not shown). The signature database 200 is illustrated with a dashed line to indicate that data in the two versions of the database 200 may not be the same until a synchronization event occurs.

As illustrated in FIG. 2, the client computer 102 includes an operating system 206, which may be a general purpose operating system designed for a limited resource computer, such as a Microsoft® operating system, UNIX® operating system, or PALM® operating system. As known to those skilled in the art and others, the operating system 206 controls the general operation of the client computer 102 and is responsible for management of hardware and basic system operations, as well as running applications. More specifically, with regard to the present invention, the operating system 206 is configured to query the signature database 200 before allowing an application to be executed on the client computer 102. As described in further detail below with reference to FIG. 4, if the signature database 200 indicates that the application is below a security threshold—for example, if the application is known malware—then the operating system 206 may be configured to prevent the application from executing.

As illustrated in FIG. 2, the service provider server 110 and the client computer 102 are communicatively connected via the wireless network 114. However, as described above with reference to FIG. 1, a general purpose computer and a limited resource computer may be communicatively connected using other mechanisms, such as a direct communication link implemented in a "docking" configuration. In any event, those skilled in the art and others will recognize that FIG. 2 is a simplified example of one general purpose computer and limited resource computer capable of performing the functions implemented by the present invention. Actual embodiments of the present invention will have additional components not illustrated in FIG. 2 or described in the accompanying text. Also, FIG. 2 shows an exemplary component architecture for protecting a client computer 102 from malware but other component architectures are possible.

With reference now to FIG. 3, a method 300 that identifies malware on behalf of a limited resource computer when the limited resource computer attempts to obtain an application from a remote source, such as a Web server, will be described. As illustrated in FIG. 3, the method 300 begins at decision block 302 where the method 300 remains idle until a command to download an application from a remote computer is generated from or on behalf of a limited resource computer. Since the command to download an application from a remote computer may be generated using existing systems that are generally known in the art, further description of these systems will not be provided here. However, it should be well understood that the command may be issued in a number of different contexts. For example, a limited resource computer (e.g., the client computer 102) connected to a wireless network may issue the command directly by, for example, visiting a Web site and activating a hyperlink. Alternatively, the command may be generated, at block 300, by a general purpose computer on behalf of a limited resource computer. For example, in the computer "docking" configuration described above with reference to FIG. 1, the docking computer 106 may download applications on behalf of the client computer 104 and place the application data in a shared directory that is used by a synchronization system.

At block 304, application data that is the object of the command issued at block 302 is transmitted to the general purpose computer. Since communication protocols for transmitting data over a network are generally known in the art, descriptions of the techniques used to implement this aspect of the method 300 will not be described here. Significantly, the present invention is designed to function in a system in which application data directed to a limited resource computer is first received by a general purpose computer. As described in further detail below, the general purpose computer acts as intermediary, or gateway, protecting the limited resource computer from malware that propagates on the network.

At block 306, the method 300 causes a scan of the application data received by the general purpose computer to be performed. As mentioned previously, software-implemented routines in the scan engine 204 (FIG. 2) are configured to scan application data for malware. In one embodiment of the present invention, the scan performed at block 306 includes attempting to match patterns in the application data to a malware "signature." The signature may be generated from a characteristic subset of a malware that is maintained in the signature database 200 (FIG. 2). However, the scan may include additional malware identification techniques. For example, the scan performed at block 306 may include identifying heuristic factors that are characteristic of malware or emulating program behavior in an emulation environment. In any event, it should be well understood that the techniques for identifying malware described above should be construed as exemplary and not limiting. As illustrated in FIG. 3, after a scan of the application data is performed, the method 300 proceeds to decision block 308, where a determination is made regarding whether malware was identified in the incoming application data. If malware was not identified, the method 300 proceeds to block 312, described below. Conversely, if malware was identified, the method 300 proceeds to block 310.

At block 310, the method 300 performs actions for handling the detection of malware in the incoming application data. In this instance, the application data will not be forwarded to a limited resource computer that requested the application data. Instead, a warning message that indicates that the application is malware is transmitted to the limited resource computer. Moreover, other steps for handling a malware infection that are generally known in the art may be performed at block 310. Then the method 300 proceeds to block 318, where it terminates.

At block 312, the method 300 generates a signature of the application data received at the general purpose computer. In an exemplary embodiment of the present invention, a hash algorithm is used, at block 312, to process the application data or a characteristic subset of the application data and generate the signature. For example, the existing hash algorithm commonly known "SHA-1" may be used to generate the signature. However, other algorithms or functions that are capable of generating a signature from application data may be used without departing from the scope of the present invention. Thus, the example provided above should be construed as exemplary and not limiting.

As illustrated in FIG. 3, at block 314, a set of data, containing multiple components, is transmitted to the limited resource computer that issued the command to download the application, at block 302. If block 314 is reached, malware was not detected in the application data by the general purpose computer. In this instance, the application data, the signature of the application generated at block 312, and a variable indicative of the application's security status is forwarded to the limited resource computer at block 314. Since communication protocols for transmitting a set of data over a network connection or a direct communication link are generally known in the art, descriptions of the techniques used to implement this aspect of the method 300 will not be described here. Once the application data is transmitted to the limited resource computer, the application may be installed and executed.

At block 316, the method 300 adds an entry for the application in the signature database 200, maintained on the limited resource computer. Generally described, the signature database 200 stores the security status of each application installed on a limited resource computer. As described in more detail below with reference to FIG. 4, adding an entry for an application in the signature database 200 includes inserting the signature of the application and the variable indicative of the application's security status in the signature database 200. Then the method 300 proceeds to block 318, where it terminates.

For illustrative purposes and by way of example only, content in a representative signature database 200 is illustrated in FIG. 4. As illustrated, the signature database 200 consists of three columns, each of which contains multiple entries. The columns are identified as APPLICATION SIGNATURE 300, FIRST BIT 302, and SECOND BIT 304. The APPLICATION SIGNATURE 300 column contains signatures that uniquely identify an application, such as the signature that was generated at block 312. The FIRST BIT 302 and SECOND BIT 304 columns each store a value that collectively identifies the security status of the application. For example, both the FIRST BIT 302 and SECOND BIT 304 columns contain a value that is either a "0" or a "1." In one embodiment of the present invention, if the FIRST BIT 302 column contains a "1" and the SECOND BIT 304 column contains a "0," then the security state of the file is "known malware." Alternatively, if the FIRST BIT 302 column contains a "0" and the SECOND BIT 304 column contains a "1," then the state of the file is "known good." Also, if the FIRST BIT 302 column contains a "0" and the SECOND BIT 304 column contains a "0," then the state of the file is "unknown" with regard to being infected with malware. Although FIG. 3 illustrates an exemplary signature database 200 that contains specific entries, those skilled in the art will recognize that the signature database 200 may function with additional or fewer entries than those described above.

Returning to the method 300 described with reference to FIG. 3, it should be well understood that implementations of the present invention are not limited to the exemplary method 300 depicted in FIG. 3. Other methods may include additional actions or eliminate some actions shown. For example, the exemplary method 300 is described in the context of system where a set of data is transmitted from the general purpose computer to the limited resource computer (at block 314) and inserted into the signature database (at block 316). However, as mentioned previously, the present invention may be implemented in conjunction with a synchronization system. For example, an application signature may be inserted into the signature database 200 on the general purpose computer. Then data in the signature database 200 on both the general purpose computer and the limited resource computer may be synchronized. Thus, the method 300 depicted in FIG. 3 and described in the accompanying text is exemplary.

As described above with reference to FIG. 3, the present invention classifies applications as either (1) known good, (2) known malware, or (3) unknown with regard to being infected with malware. Typically, an application is classified as being "known good" when antivirus software, on a general purpose computer, does not identify malware in the application data. However, in alternative embodiments of the present invention, an application may be classified as "known good" in different instances. For example, some applications may be digitally signed as originating from a trusted source. In this instance, the digitally signed application is automatically classified as "known good," without a scan of the application being performed. Obviously an application is classified as "known malware" when antivirus software, on a general purpose computer, identifies malware in the application data. Also, an application may be classified as "unknown" with regard to being infected with malware. For example, an application may be installed on a limited resource computer from a disk or other storage medium. In this instance, a general purpose computer may not be able to scan the application for malware before the application is installed. However, as described below with reference to FIG. 5, malware that gains access to a limited resource computer through a disk or other storage medium will be identified when antivirus software on the general purpose computer is able to access the application data. For example, a scan of the application data may be performed when a network connection is established between the general purpose computer and the limited resource computer.

As mentioned above, when an entry for an application is added to the signature database 200, the application may be executed on the limited resource computer. However, as mentioned previously, the operating system on a limited resource computer will typically be configured to query the signature database 200 before allowing an application to be executed. If the application's security classification is below the minimum required by the operation system, the application will not be executed. While a default configuration for the minimum security classification required to execute an application is provided, the minimum security classification may also be configured by the user. For example, a user may configure the limited resource computer to only allow applications to execute that are "known good." Alternatively, a user may configure the limited resource computer to execute any application that is not "known malware." Also, in some instances, an administrative entity such as the department of a corporation that manages a network may set a minimum security policy which may not be modified an individual user of the network. As a result, the administrative entity is able to manage limited resource computers connected to the network to only execute, for example, only applications that are "known good."

Figure 5:
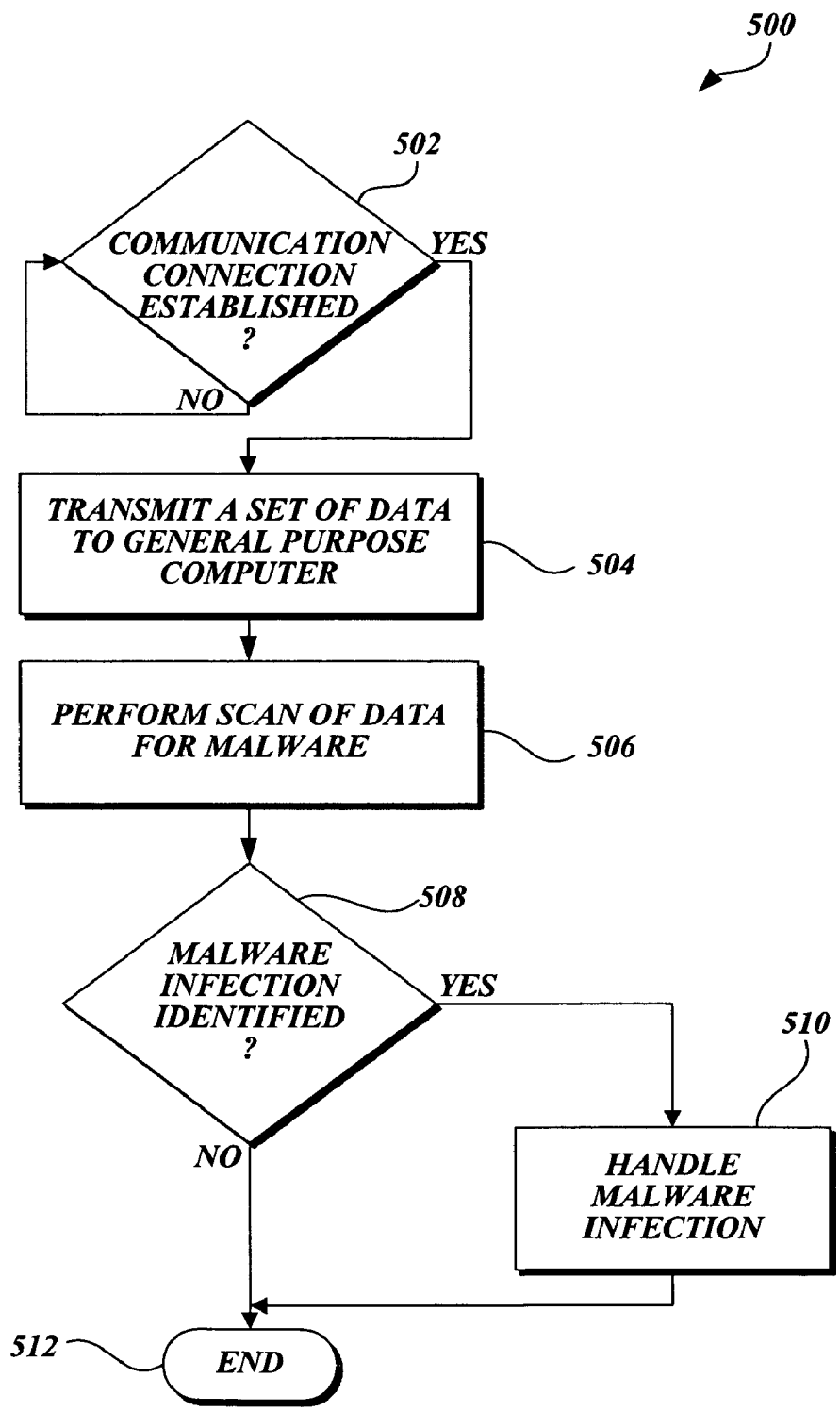
FIG. 5 is a flow diagram illustrating one exemplary embodiment of a software implemented method for identifying malware already resident on a limited resource computer, in accordance with the present invention.

Now with reference to FIG. 5, an update method 500 that determines whether an application that is resident on a limited resource computer is infected with malware will be described. In some instances, a new malware is developed that is not initially detected by antivirus software. As a result, the malware spreads to a plurality of computers, including limited resource computers communicatively connected to modern communication networks. Eventually, antivirus software is updated to recognize the new malware. However, some computers may still be infected with the malware and a computer user may not take the necessary corrective action to eliminate the infection. Therefore, a need exists to identify malware that is already resident on a limited resource computer. The update method 500, described with reference to FIG. 5 is directed to satisfying these and other deficiencies in the prior art.

At block 502, the update method 500 remains idle until a communication connection is established between the general purpose computer (e.g., the service provider server 210) and the limited resource computer (e.g., the client computer 102) that implement the present invention. Those skilled in the art and others will recognize that, in practice, limited resource computers frequently disconnect from communication networks and "docking" stations. In accordance with one embodiment of the present invention, the update method 500 performs a scan for malware each time a communication connection is established with the limited resource computer. However, the analysis performed by the method 500 may occur in other instances without departing from the scope of the present invention.

At block 504, a set of data is transmitted from a limited resource computer to the general purpose computer that maintains "up-to-date" antivirus software. In some limited resource computers, a signature for each application is generated and stored in a database when an application is installed on the computer. As described previously with reference to FIG. 3 (at block 312), a signature of an application may be used to identify an application. Also, a signature may be compared to other signatures in order to determine if an application is characteristic of malware. In one embodiment of the present invention, the signatures of applications on the limited resource computer are transmitted to the general purpose, at block 504. Since communication protocols for transmitting a set of data over a network connection or a direct communication link are generally known in the art, descriptions of the techniques used to implement this aspect of the method 500 will not be described here.

In an alternative embodiment of the present invention, when an application is installed on a limited resource computer, a signature of the application is generated and compared to entries in the signature database 260. If an entry for the application signature is not already in the database 200, then an entry for the signature is added. In this embodiment, the limited resource computer and general purpose computer communicate data using a synchronization system. For example, at block 504, an application signature may be added to the signature database 200 on the limited resource computer. Then, the signature database 200 located on the general purpose computer may be synchronized with the signature database 200 on the limited resource computer. When the synchronization process completes, the general purpose computer is able to access the signatures of each application that is installed on the limited resource computer.

In yet another alternative embodiment, the set of data transmitted from the limited resource computer to the general purpose computer, at block 509, includes the complete executables of applications installed on the limited resource computer. In this embodiment, all of the data that has the potential to implement the functionality of malware is transmitted and made available to antivirus software on the general purpose computer. As a result, malware detection techniques that analyze each byte of data in an application may be used by the antivirus software to detect malware on behalf of the limited resource computer.

As illustrated in FIG. 5, at block 506, the update method 500 causes antivirus software to scan data received from the limited resource computer. As mentioned previously, in embodiments of the present invention, a signature for each application on a limited resource computer is transmitted to a general purpose computer when a communication connection is established between the computers. In this embodiment, the scan performed at block 506 includes determining if any of the signatures received by the limited resource computer match a signature generated from known malware.

In an alternative embodiment of the present invention, complete executables are transmitted from the limited resource computer to the general purpose computer when a communication connection is established between the computers. In this embodiment, the scan performed at block 506 may include matching patterns of data in the executables with a malware signature. However, as mentioned previously, when a complete executable is available to antivirus software, other malware detection techniques may be used to scan for malware. For example, a scan engine that analyzes each byte of data, such as scan engine that is capable of detecting polymorphic malware may be used to perform the scan at block 506.

As illustrated in FIG. 5, at decision block 508, the method 500 determines whether malware was identified at block 506. If malware was not identified, the method 500 proceeds to block 512 where it terminates. Conversely, if malware was identified, the method 500 proceeds to block 510.

At block 510, the method 500 performs actions for handling a malware infection. In one embodiment of the present invention, data in the signature database 200 is changed to reflect that an application was identified as "known malware." As mentioned previously, an operating system installed on a limited resource computer will typically be configured to prevent an application that is identified as known malware, from being executed. However, other techniques for handling a malware infection that are generally known in the art may be performed at block 510. For example, the limited resource computer may be immediately notified that an application is infected with malware using a warning message. In this instance, the limited resource computer may delete the malware, "quarantine" the malware, or take other actions that prevent the malware from implementing malicious functionality. Then, the method 500 proceeds to block 512, where it terminates.

While the preferred embodiment of the invention has been illustrated and described, it will be appreciated that various changes can be made therein without departing from the spirit and scope of the invention.

What is claimed is:

1. A computer system that prevents malware from being executed on a limited resource computer, the computer system comprising:
   a general purpose computer operative to identify malware on behalf of a limited resource computer, the general purpose computer comprising:
      antivirus software designed to determine if an application is infected with malware; and
      a signature database resident on the general purpose computer for tracking security classification of the application, the antivirus software comparing signatures in the signature database with known malware signatures to associate a security classification with the application signature and record the security classification in the signature database, the security classification comprising at least known malware signatures, unknown signatures, and signatures known to be from a trusted source;
   the limited resource computer comprising:
      a signature database resident on the limited resource computer for tracking the security classification of the application stored on the limited resource computer, the limited resource computer generating a signature of the application when the application is installed on the limited resource computer and storing the signature in the signature database, the signature of the application being generated by applying a hash function to a subset of program code which implements the application;
      an operating system operative to query the signature database of the limited resource computer for a security status of the application before executing the application, the security status comprising at least known good, known malware, and unknown application; and
      the operating system operative to determine whether to execute the application on the limited resource computer based upon the security status; and
   the general purpose computer being operatively coupled to the limited resource computer via a communication connection to transmit data between the general purpose computer and the limited resource computer, the data transmitted including the application signature and associated security classification from the respective signature databases;
   wherein the limited resource computer is a small mobile device selected from personal desktop assistant, handheld and palm-type computers, and pen tablets; and
   wherein the general purpose computer is desktop or laptop computer.

2. The computer system as recited in claim 1, further comprising a synchronization system capable of synchronizing the database stored on both the general purpose computer and the limited resource computer.

3. In a computer environment that includes a general purpose computer and a limited resource computer, a method of identifying malware in an application on the limited resource computer and preventing the malware from being executed, the method comprising:
   the general purpose computer operative to identify malware on behalf of the limited resource computer, the general purpose computer comprising:
      antivirus software designed to determine if an application is infected with malware; and
      a signature database resident on the general purpose computer for tracking security classification of the application, the antivirus software comparing signatures in the signature database with known malware signatures to associate a security classification with the application signature and record the security classification in the signature database, the security classification comprising at least known malware signatures, unknown signatures, and signatures known to be from a trusted source;
   the limited resource computer comprising:
      a signature database resident on the limited resource computer for tracking the security classification of the application stored on the limited resource computer, the limited resource computer generating a signature of the application when the application is installed on the limited resource computer and storing the signature in the signature database, the signature of the application being generated by applying a hash function to a subset of program code which implements the application;
      an operating system operative to query the signature database of the limited resource computer for a security status of the application before executing the application, the security status comprising at least known good, known malware, and unknown application; and the operating system operative to determine whether to execute the application on the limited resource computer based upon the security status; and the general purpose computer being operatively coupled to the limited resource computer via a communication connection to transmit data, including the application signature and associated security classification from the respective signature databases, between the general purpose computer and the limited resource computer;

wherein the limited resource computer is a small mobile device selected from personal desktop assistant, handheld and palm-type computers, and pen tablets; and wherein the general purpose computer is desktop or laptop computer.

* * * * *